United States Patent [19]

Graber

[11] Patent Number: 4,863,080

[45] Date of Patent: Sep. 5, 1989

[54] BUMPER MOUNTED BICYCLE CARRIER

[75] Inventor: John W. Graber, Stoughton, Wis.

[73] Assignee: Graber Products, Inc., Madison, Wis.

[21] Appl. No.: 206,422

[22] Filed: Jun. 14, 1988

[51] Int. Cl.$^4$ .............................................. B60R 9/10
[52] U.S. Cl. ................................................ 224/42.03 B
[58] Field of Search ................. 224/42.03 A, 42.03 B,
224/42.03 R, 42.04, 42.06, 309, 329, 42.07,
42.08; 280/500, 502

[56] References Cited

U.S. PATENT DOCUMENTS

| | | | |
|---|---|---|---|
| 3,144,183 | 8/1964 | Lamberti | 224/42.07 |
| 3,225,986 | 12/1965 | Anderson | 224/42.03 B |
| 3,670,935 | 6/1972 | Hinkston | 224/42.03 B |
| 3,841,544 | 10/1974 | Berger | 224/42.03 R |
| 3,847,317 | 11/1974 | Raff et al. | 224/42.03 B |
| 3,876,123 | 4/1975 | Stuntz | 224/42.03 B |
| 3,877,622 | 4/1975 | McLain | 224/42.03 B |
| 4,050,616 | 7/1977 | Mosow | 224/42.03 B |
| 4,298,151 | 11/1981 | O'Connor | 224/329 |
| 4,318,501 | 3/1982 | Graber | 224/42.03 R |
| 4,336,897 | 6/1982 | Luck | 224/42.03 B |
| 4,432,479 | 2/1984 | Graber | 224/322 |
| 4,513,897 | 4/1985 | Graber | 224/314 |
| 4,676,413 | 6/1987 | Began et al. | 224/42.03 B |

Primary Examiner—Henry J. Recla
Assistant Examiner—J. Casimer Jacyna
Attorney, Agent, or Firm—Vernon J. Pilotte

[57] ABSTRACT

A bumper attached bicycle carrier including a carrier frame having generally upright rack legs and bicycle engaging arms extending rearwardly from the frame for engaging and supporting a bicycle in a generally upright condition. A bumper engaging foot assembly is mounted on each rack leg and each foot assembly includes a generally V-shaped pivot bracket pivotally mounted at its apex on the rack leg at locations spaced above the lower end of the rack leg, and upper and lower bumper engaging feet pivotally mounted on each pivot bracket for pivotal movement about foot pivot axes parallel to and spaced laterally from the bracket pivot axis. Each foot member has a resilient bumper engaging face and the foot members are adapted to pivot relative to the associated bracket to conform to the contour of bumpers of widely different shape. Lower flexible anchors are adjustably attached to the lower ends of the rack legs and upper flexible straps are attached to the carrier frame above the pivot axis to draw the legs to a generally upright condition while pressing the foot assemblies against the rear side of the bumper.

4 Claims, 2 Drawing Sheets

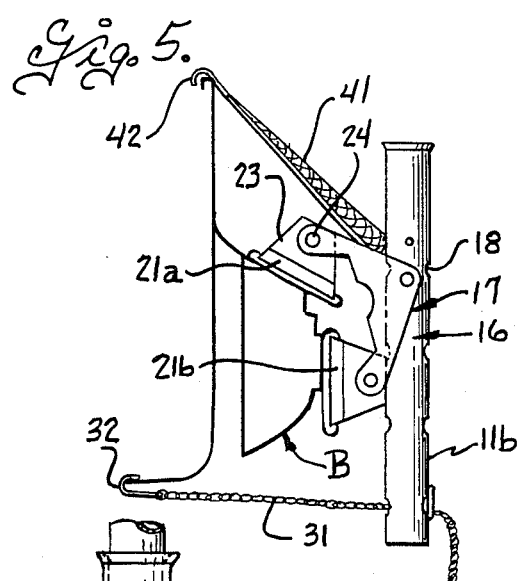
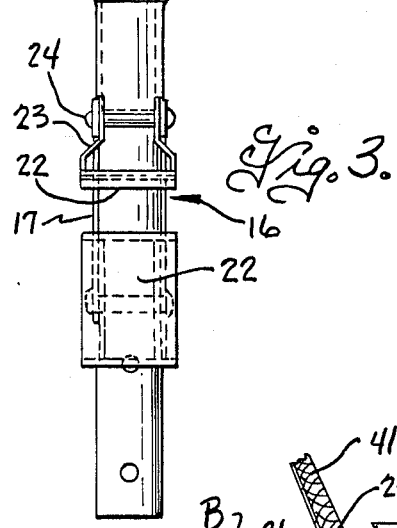
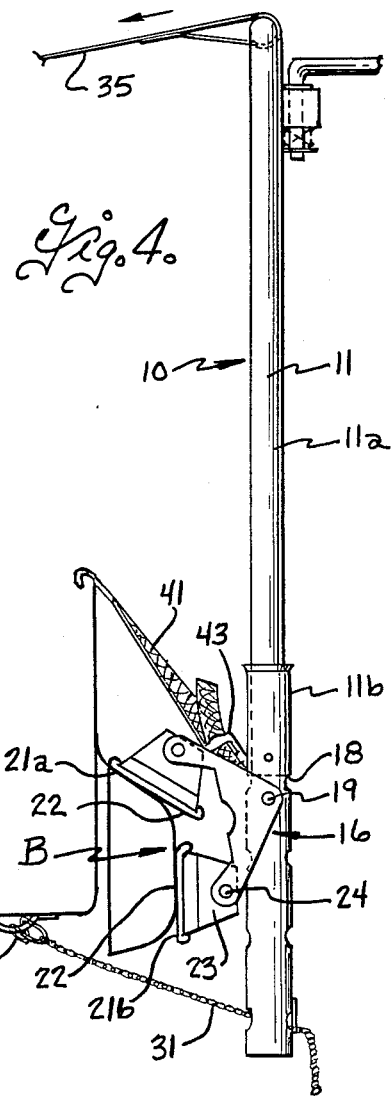
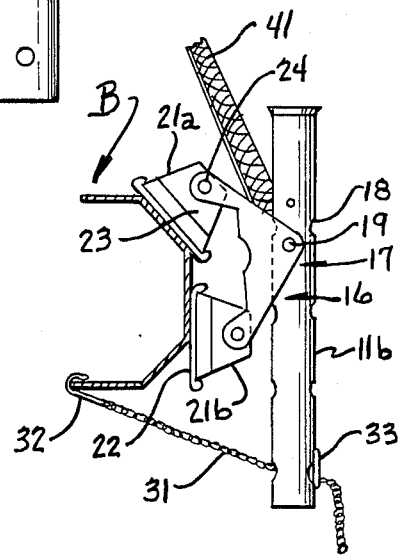

BUMPER MOUNTED BICYCLE CARRIER

BACKGROUND OF THE INVENTION

Various different bumper mounted bicycle carriers have heretofore been proposed for mounting bicycles on the rear bumper of a vehicle, examples of which are disclosed in U.S. Pat. Nos. 3,225,986; 3,670,935; 3,841,544; 3,847,317; 3,876,123; 3,877,622; 4,050,616; 4,298,151; 4,318,501; and 4,336,897. Most of the above bicycle carriers provide clamps or brackets which require engagement with the upper and lower edges of the vehicle bumper in order to retain the carrier on the bumper. However, the rear bumpers on many automobiles presently being manufactured are covered in whole or in part by a flexible plastic and in such a manner that the upper and/or lower edges of the bumper are covered or inaccessible for attachment of hooks or the like. Moreover, the plastic covered bumpers are subject to deformation and damage, if subjected to high localized pressures.

U.S. Pat. No. 4,336,897 discloses one embodiment of a bicycle rack which is intended for use on vehicles in which the upper edge of the bumper is inaccessible. In that embodiment, the upright legs of the carrier are provided with forwardly facing generally upright channels that are adapted to engage the rear side of the bumper, and a foot member is mounted on each channel for pivotal movement between a folded position in the channel and an erected position extending perpendicular to the channel for engagement with the upper surface of the bumper. Such an arrangement is not well suited for use with vehicle bumpers of widely different configuration and, moreover, would apply high localized pressures which could deform and/or damage the plastic cover on the bumper.

The applicant's prior U.S. Pat. No. 4,513,897 discloses a bicycle carrier having forward and rear pairs of vehicle engaging legs adapted for mounting on the rear body portion of a vehicle. As disclosed in that patent, vehicle engaging foot assemblies are pivotally mounted on the lower ends of the rear legs and each foot assembly has a pair of pivotally mounted foot members to accommodate different vehicle body contours. The bicycle carrier disclosed in that patent, however, was not adapted for mounting on a vehicle bumper.

SUMMARY OF THE INVENTION

It is an object of the present invention to provide a bumper mounted bicycle carrier which is adapted for mounting on vehicle bumpers of widely different contour, and including bumpers in which the upper edges and/or lower edges are covered or inaccessible, and which minimizes deformation and damage to the bumpers.

Accordingly, the present invention provides a bicycle carrier for attachment to a vehicle bumper and which comprises a rigid carrier frame having a pair of generally upright rack legs and bicycle support means mounted on the frame and adapted to extend rearwardly to support the bicycle on the frame. Bumper engaging foot assemblies are provided for supporting the rack legs on the vehicle bumper with the rack legs extending generally upright crosswise of the vehicle bumper. The bumper engaging foot assemblies each include pivot bracket means pivotally mounted on a respective one of the rack legs at a location spaced above its lower end for pivotal movement about a horizontal bracket pivotal axis transverse to the associated rack leg, each pivot bracket having upper and lower leg portions extending in relative diverging relation from the bracket pivot axis to one side of the associated leg, and upper and lower foot members each having a bumper engaging face and respectively pivotally mounted on the upper and lower legs of the pivot bracket for pivotal movement relative thereto about foot pivot axes disposed generally parallel to and offset from the bracket pivot axis. The rack legs of the carrier have lower portions that extend downwardly from the bracket pivot axis to a level below the lower foot member and upper portions that extend upwardly from the associated bracket pivot axis to a level above the upper foot member. A lower flexible tie means is attached to each rack leg at a location spaced below the associated pivot axis and has a lower vehicle engaging hook at one end, and upper flexible tie means are attached to the carrier frame at a location above the bracket pivot axis and have upper vehicle engaging hook means. The upper and lower foot members of each bumper engaging bracket assembly are adapted to pivot about their respective upper and lower foot pivot axes relative to the associated pivot bracket to adapt the vehicle engaging faces to the contour of the outer face of the vehicle bumper, and the rack leg means are adapted to pivot about the associated pivot bracket to a generally upright position. The upper and lower flexible tie means are adjustable to draw the rack legs toward a generally upright position and press the bumper engaging foot assemblies against the outer face of the bumper.

An intermediate flexible tie means is advantageously provided and attached to each pivot bracket adjacent the bracket pivot axis, with an intermediate vehicle engaging hook adapted to engage an edge of the vehicle at a level above the bumper. The intermediate flexible tie means aids in retaining the carrier on the bumper, when the upper flexible tension means is temporarily detached from the vehicle to provide access to the vehicle trunk.

BRIEF DESCRIPTION OF THE DRAWINGS

FIG. 3 is a fragmentary view of the carrier taken on the plane 3—3 of FIG. 2;

FIG. 4 is a side elevational view of the bicycle carrier, illustrating the same mounted on another form of vehicle bumper; and FIGS. 5 and 6 are fragmentary side views of the lower portion of the bicycle carrier, illustrating the same mounted on still other forms of vehicle bumpers.

DETAILED DESCRIPTION

Figure 1:
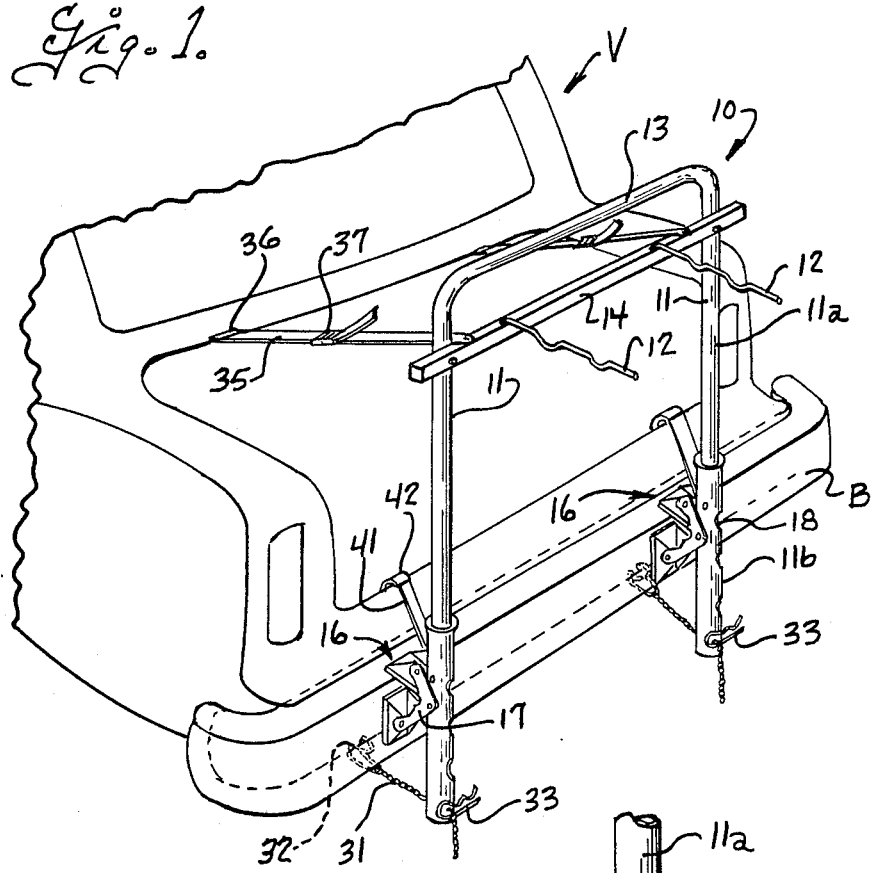
FIG. 1 is a fragmentary perspective view of the rear portion of a vehicle having the bicycle carrier of the present invention mounted thereon.

The bicycle carrier in general comprises a rigid carrier frame means 10 having a pair of generally upright rack leg means 11, and bicycle support means 12 mounted on the frame means and adapted to extend rearwardly therefrom to support one or more bicycles in a generally upright condition on the carrier frame means. The upright leg means 11 are rigidly interconnected adjacent their upper ends, as by cross frame members herein shown at 13 and 14. First and second bumper engaging foot assemblies 16 are provided for supporting the rack leg means on the bumper B of a vehicle V, with the rack leg means extending generally upright and crosswise of the vehicle bumper. In the embodiment illustrated, the rack leg means 11 are each formed in two detachable sections, with the upper sections 11a telescopically received in tubular lower sections 11b. Stop means such as a depression or depressions 18 are provided on the lower tubular sections 11b to engage and limit downward movement of the associated upper sections 11a. Alternatively, the rack leg means could be formed in one piece, if desired.

Bumper engaging foot assemblies 16 are provided for supporting the rack leg means 11 on the vehicle bumper, with the rack leg means extending generally upright and crosswise of the bumper. The bumper engaging foot assemblies each include pivot bracket means, preferably formed by a pair of generally v-shaped bracket members 17 disposed at relatively opposite sides of each rack leg means and mounted adjacent their apex by a bracket pivot 19 such as a bolt, rivet or the like, for pivotal movement relative to the rack leg about a generally horizontal bracket pivot axis. In the embodiment illustrated, the pivot bracket members are mounted on the lower rack leg sections 11b at a location spaced a substantial distance above the lower end of the rack leg means. Each pivot bracket member 17 includes upper and lower leg portions that extend in relatively diverging relation from the bracket pivot 19 to one side of the associated rack leg. Upper and lower foot members 21a and 21b are respectively mounted on the distal ends of the upper and lower legs for pivotal movement about foot pivots 24 generally parallel to and offset from the bracket pivot 19. The foot members each have a generally rigid body 23 that is mounted on the pivot bracket by a foot pivot 24 and a resilient and preferably generally flat bumper engaging face 22. The bumper engaging face of each foot member is disposed in a plane parallel to and laterally offset from the associated foot pivot, with the foot pivot 24 located approximately equidistant from the ends of the bumper engaging face 22.

Figure 2:
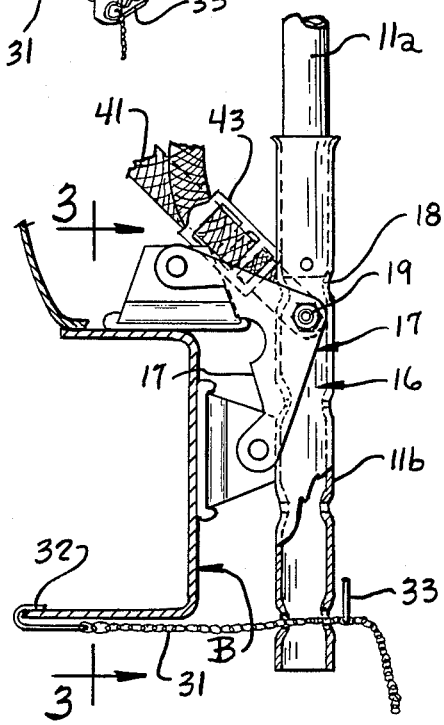
FIG. 2 is a fragmentary vertical sectional view through the lower portion of the bicycle carrier, illustrating the same mounted on one form of vehicle bumper.

The upper and lower foot members 21a and 21b are adapted to pivot about the associated foot pivot 24 relative to the pivot bracket to adapt and conform to the contour of the bumper engaged by the bumper engaging faces 22. As shown in FIGS. 2 and 4–6, the foot members can pivot relative to the associated bracket to conform to bumpers of widely different contour, and in such a manner that the faces 22 contact the bumper over relatively wide areas to distribute the forces applied to the surface of the bumper. The rack leg means are adapted to pivot about the bracket pivot axis relative to the associated pivot bracket so that the rack leg means can be moved into a generally upright position, while the foot members remain in engagement with the surface of the vehicle bumper. Lower flexible tie means 31, conveniently in the form of a flexible chain is attached to the lower end of each of the rack leg means and has a lower vehicle engaging hook 32 at one end. The lower flexible tie means is adapted to extend below the bumper B and to engage a part on the underside of the vehicle. The lower hook may engage the lower edge of the bumper if it is rigid and accessible, as shown in FIGS. 1, 2 and 6. The lower vehicle engaging hook can also be attached to the tie down anchor loops commonly provided on the vehicle such as shown in FIG. 4, or other part on the vehicle body such as a reinforcing strap on the lower part of the trunk, or openings formed in the underside of the vehicle or at the rear side of the bumper. The lower tie means 31 is adjustable to vary the distance between the lower vehicle engaging hook 32 and the lower end of the rack leg means and the flexible attaching means can conveniently be extended through an opening in the lower portion of the rack leg means as best shown in FIG. 2, and secured in an adjusted position by a clip 33 adapted to extend through a loop in the chain. Upper flexible tie means 35 are attached to the carrier frame at location spaced above the bracket pivot axis and upper vehicle engaging hooks 36 (FIG. 1) are provided on the ends of the upper flexible tie means 35 to engage a part on the vehicle such as the edge of the deck lid, hatch lid, or the like. The upper flexible tie means 35 are preferably in the form of flexible straps provided with adjusting buckles 37 to enable adjustment of the distance between the upper hooks 36 and the upper portion of the carrier frame. When installing the carrier on the vehicle bumper, the lower flexible tie means 31 is adjusted so that the rack legs extend upwardly and slightly rearwardly from the vertical, and the upper flexible tie means thereafter adjusted to draw the carrier frame to a generally upright condition. This firmly presses the bumper engaging foot assemblies against the vehicle bumper so that the weight of the carrier and the bicycles carried thereby is supported on the bumper.

An intermediate flexible tie means 41 is advantageously provided and attached to the vehicle engaging foot assemblies adjacent the bracket pivot 19. The intermediate flexible tie means 41 each have intermediate vehicle engaging hooks 42 at one end adapted to engage a part of the vehicle such as the lower edge of the trunk or hatch opening, at a level above the bumper B, and the intermediate tie means are adjustable as by buckles 43. The intermediate tie means 41 operate to hold the bumper engaging foot assemblies in position on the bumper, in the event the upper flexible tie means 35 are loosened or removed to gain access to the trunk. In the embodiment shown in which the rack legs are formed of detachable upper and lower sections, the intermediate flexible tie means also operate to hold the lower sections 11b of the rack legs in position on the bumper, when the upper sections of the rack legs are removed.

From the foregoing it is believed that the construction and installation of the bicycle carrier on the vehicle will be readily understood. The feet on the bumper engaging foot assemblies can pivot relative to the pivot brackets to conform to the contour of bumpers of widely different shape and distribute the forces from the carrier rack over relatively wide areas of the bumper to minimize distortion and damage to the bumpers. The rack legs can pivot relative to the pivot brackets about the bracket pivots 19 so that the rack can be positioned in a generally upright condition, while the bumper engaging feet remain in engagement with the bumper.

The embodiments of the invention in which exclusive property or privilege is claimed are defined as follows:

1. A bicycle carrier for attachment to a vehicle having a bumper comprising, rigid carrier frame means including generally upright first and second tubular rack leg means each having front and rear sides and a lower end, bicycle support means mounted on the frame means and adapted to extend rearwardly thereof to support a bicycle on the carrier frame means, first and second bumper engaging foot assemblies for supporting the first and second tubular rack leg means at locations spaced above their lower ends on a vehicle bumper with the rack leg means extending generally upright crosswise of the vehicle bumper, the first and second bumper engaging foot assemblies each including:
  (a) pivot bracket means pivotally mounted directly to a respective one of the first and second tubular rack leg means at a location spaced above the lower ends thereof for pivotal movement about a horizontal bracket pivot axis transverse to the associated rack leg means, each pivot bracket means having upper and lower leg portions extending in relatively diverging relation from the bracket pivot axis forwardly of the front side of the associated rack leg means,
  (b) upper and lower foot members each having a bumper engaging face at one side and means defining a foot pivot axis at a side opposite said one side, upper and lower foot pivot means respectively pivotally mounting the upper and lower foot members on the upper and lower leg portion of each pivot bracket means with the foot pivot axes disposed in a plane generally parallel to and offset from the bracket pivot axis of the associated pivot bracket means, the upper and lower foot members being disposed forwardly of the front side of the associated rack leg means respectively above and below the bracket pivot axis,
the first and second tubular rack leg means each having lower portions extending downwardly from the bracket pivot axis to a level below the associated lower foot member and upper portions extending upwardly from the associated pivot axis to a level above the associated bracket upper foot member, a lower flexible tie means attached to each rack leg means at a location spaced below the associated pivot bracket means and having lower vehicle engaging hook means at one end, the lower flexible tie means being adjustable to vary the distance between the lower vehicle engaging hook means and the lower portions of the associated rack leg means, upper flexible tie means attached to the carrier frame means at a location above said bracket pivot axes and having upper vehicle engaging hook means thereon, the upper flexible tie means being adjustable to vary the distance between the upper vehicle engaging hook means and the carrier frame means, the pivot bracket means supporting the upper and lower foot members for movement in opposite directions relative to the front side of the associated rack leg means and the upper and lower foot members of each bumper engaging bracket assembly being pivotally movable about the respective upper and lower foot pivot axis relative to the associated pivot bracket means to conform the vehicle engaging faces to the contour of the outer face of a vehicle bumper for supporting the bicycle carrier thereon, the upper and lower flexible tie means being adjustable, when the carrier is mounted on the vehicle bumper, to draw the rack legs means toward a generally upright position and press the bumper engaging foot assemblies against the outer face of the bumper.

2. A bicycle carrier according to claim 1 wherein said first and second tubular rack leg means each include a lower tubular rack leg section and an upper tubular rack leg section telescopically engageable with the associated lower rack leg section, said first and second bumper engaging foot assemblies being mounted on a respective one of the lower rack leg sections.

3. A bicycle carrier according to claim 2 including an intermediate flexible tie means attached to each pivot bracket means adjacent the associated bracket pivot axis and having intermediate vehicle engaging hook means at one end, said intermediate flexible tie means being adjustable to vary the distance between the intermediate vehicle engaging hook means and the associated pivot bracket means.

4. A bicycle carrier according to claim 1 including an intermediate flexible tie means attached to each pivot bracket means adjacent the associated bracket pivot axis and having intermediate vehicle engaging hook means at one end, said intermediate flexible tie means being adjustable to vary the distance between the intermediate vehicle engaging hook means and the associated pivot bracket means.

* * * * *